March 28, 1944. S. H. BENJAMIN 2,344,961
NONREFILLABLE CONTAINER
Filed May 6, 1941 7 Sheets-Sheet 1

INVENTOR.
Sidney H. Benjamin
Howard Freeman
his ATTORNEY

March 28, 1944.     S. H. BENJAMIN     2,344,961
NONREFILLABLE CONTAINER
Filed May 6, 1941     7 Sheets-Sheet 2

INVENTOR.
Sidney H. Benjamin
BY
his ATTORNEY

March 28, 1944. S. H. BENJAMIN 2,344,961
NONREFILLABLE CONTAINER
Filed May 6, 1941 7 Sheets-Sheet 3

INVENTOR.
Sidney H. Benjamin
BY
his ATTORNEY

March 28, 1944. S. H. BENJAMIN 2,344,961
NONREFILLABLE CONTAINER
Filed May 6, 1941 7 Sheets-Sheet 4

INVENTOR.
LeRoy H. Benjamin
BY
ATTORNEY

March 28, 1944. S. H. BENJAMIN 2,344,961
NONREFILLABLE CONTAINER
Filed May 6, 1941 7 Sheets-Sheet 5

INVENTOR.
Sidney H. Benjamin
BY
ATTORNEY

March 28, 1944. S. H. BENJAMIN 2,344,961
NONREFILLABLE CONTAINER
Filed May 6, 1941 7 Sheets-Sheet 6

INVENTOR.
Sidney H. Benjamin
BY
his ATTORNEY

March 28, 1944. S. H. BENJAMIN 2,344,961
NONREFILLABLE CONTAINER
Filed May 6, 1941 7 Sheets-Sheet 7

INVENTOR.
Sidney H. Benjamin
BY
his ATTORNEY

Patented Mar. 28, 1944

2,344,961

UNITED STATES PATENT OFFICE 2,344,961

NONREFILLABLE CONTAINER

Sidney H. Benjamin, Milwaukee, Wis.

Application May 6, 1941, Serial No. 392,033

8 Claims. (Cl. 206—16)

My invention relates to commodity containers and refers particularly to practically non-refillable containers of the character described.

While I illustrate and describe the devices of my invention as adapted for use with cards and safety razor blades, I do not limit myself to these particular commodities.

One object of my invention is practically non-refillable containers.

Another object of my invention is practically non-refillable containers from which only one commodity from a number of commodities can be withdrawn at one time.

Another object of my invention is practically non-refillable containers adapted for use with safety razor blades.

Another object of my invention is practically non-refillable containers from which only one safety razor blade from a number of blades can be withdrawn at one time.

Another object of my invention is devices of the character described of such low cost of production that it can be economically discarded when empty.

The above-mentioned and other valuable features of the devices of my invention will be evident upon a consideration of my specification and the accompanying drawings.

The following comments are made with special reference to my devices as containers for safety razor blades.

Manufacturers of safety razors and their users recognize the evident fact that the successful application of safety razors is very largely dependent upon the character of the blades employed therewith.

It is, therefore, customary for manufacturers of safety razors to manufacture also the blades for use in their razors, in order that their accuracy may produce the best possible results, but as the production of blades is open to the public, many manufacturers of blades, not connected with the manufacturers of safety razors, have placed highly inferior blades upon the market.

As the value of a blade can be determined only by its use, the public has purchased millions of such useless blades, a condition which could be greatly overcome if the purchaser could be assured that the blades he purchased were produced by the manufacturers of razors or other reputable manufacturers producing the most perfect product.

In the absence of being able to obtain sole proprietorship of any of the blades now in the market, which blades are those adaptable with the present commercialized razors, the best protection rests in some container for them which identifies the manufacturer and the character of the blade, and which cannot be refilled with spurious, inferior blades and thus resold under the guise of the original articles.

It is for the accomplishment of the above desirable results that my invention is directed.

Safety razor blades are now generally marketed in paper, or pasteboard cartons which can be readily refilled and resold.

While the cost of the cartons alone is small, the loss incident to their resale when refilled is very considerable, and hence, a slight increase in the cost of a non-refillable container would be more than offset by the control of the blades within the container.

My invention, therefore, relates to the production of containers, or magazines, capable of containing a predetermined number of blades, naked or wrapped, the withdrawal of which is possible, but where the recharging, or refilling, of which is practically impossible when the original blades have been withdrawn.

A further valuable feature of the devices of my invention is their low cost of production, which will allow of their being discarded when empty.

It is evident that my devices are not limited to use with safety razor blades, but are adaptable for use with other commodities, especially those of a flat nature, as cards and similar merchandise.

The valuable attribute of my devices will be evident upon a consideration of my specification and its accompanying drawings in which similar parts are designated by similar numerals.

Figure 17 is a perspective view of the barrier-spring of these devices.

Figure 1:
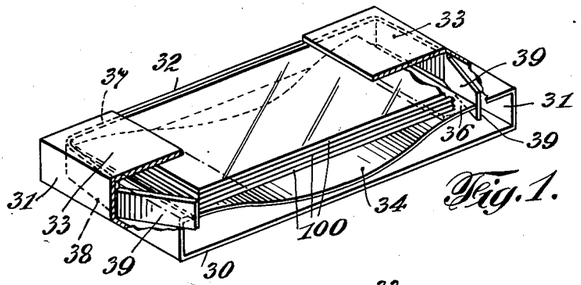
Figure 1 is a perspective view of one form of a device of my invention, partly broken away for clearness of explanation, and containing a plurality of flat commodities.
Figure 2:
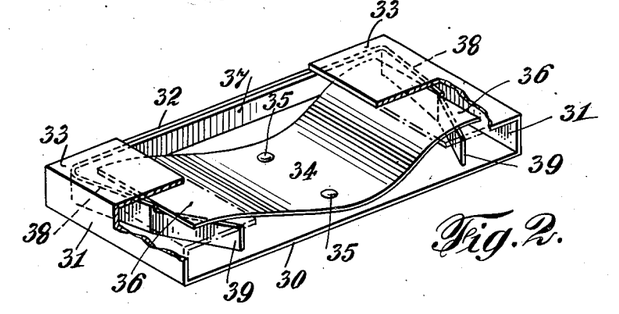
Figure 2 is a perspective view of the device of Figure 1, the commodities having been removed.
Figure 8:
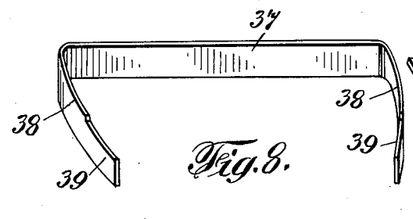
Figure 8 is a perspective view of the barrier-spring of the device of Figure 5.
Figure 9:
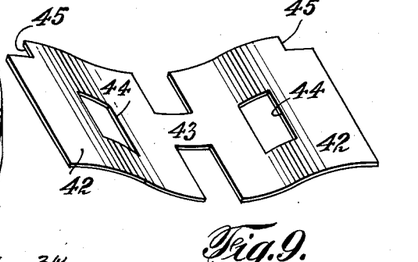
Figure 9 is a perspective view of the blade spring of the device of Figure 5.

The particular form of a device of my invention shown in Figures 1 and 2 comprises a container having the bottom member 30, the two side members 31, 31, the rear member 32 and a top comprising the two top members 33, 33. A leaf spring 34 is fixedly attached to the bottom member 30 by the rivets 35, 35, the extremities 36, 36 of the spring 34 being capable of resilient abutment upon the underfaces of the top members 33, 33. A barrier-spring comprises the rear portion 37 and the two forwardly-extended end portions 38, 38, which are forwardly extended into the two barrier members 39, 39, the two barrier members 39, 39 being extended inwardly from the members 38, 38, a perspective view of said barrier-spring being shown in Figure 8. The width of the back portion 37 and the extended portion 38 being the height between the top members 33, 33 and the bottom 30 in order to prevent vertical movement of the barrier-spring, and the widths of the barrier extension 39 is less than the distance between the top member 33 and the bottom 30 by the thickness of the spring members 36, 36 for purposes to be described later.

It is to be noted that the length of the spring 34 is such that the resilient abutment of the barrier spring members 39, 39 upon the ends thereof will allow the withdrawal of the top member of the stacked cards, or other flat commodities 100, 100, to be withdrawn while retaining the other commodities 100, 100 within the container.

The operation of this form of my device is as follows:

When the device is loaded with a plurality of stacked commodities 100, 100, the upper commodity can be drawn forwardly while the other commodities are retained within the container. Upon the withdrawal of the top commodity, the spring 34 will force the stack of commodities upwardly, thus presenting a new top commodity to be similarly withdrawn.

During this process of continuing the withdrawals, the ends 36, 36 of the spring 34 will rise upwardly while still abutting upon the barrier spring members 39, 39. When the last commodity is withdrawn, however, the ends 36, 36 of the spring 34 will be above the upper edge of the barrier spring members 39, 39, thus releasing them from abutment, causing the barrier spring members 39, 39 to be moved resiliently inward, thus positioning the spring ends 36, 36 of the spring 34 above the barrier members 39, 39, and preventing its downward movement as shown in Figure 2, which shows the device in empty condition.

The introduction of a commodity into the thus emptied container is prevented, as it must be introduced above the ends 36, 36 of the spring 34 and these ends are maintained in fixed abutment against the lower faces of the top members 33 by the barrier ends 39, 39. A further obstacle to the introduction of a commodity is the inwardly extended barrier ends 39, 39.

It is evident, therefore, that in order to introduce a new commodity, both barrier ends 39, 39 must be pressed outwardly and the ends 36, 36 of the spring 34 must be pressed downwardly against their resiliency, which is practically impossible as these spring ends 36, 36 are held resiliently against the under faces of the top members 33, 33.

The modified form of a device of my invention shown in Figures 3 to 9, inclusive, comprises a container having the bottom 30, having a recess 30' therein; the two sides 31, 31; the back 32; and the top members 33, 33 spaced from each other.

Figure 3:
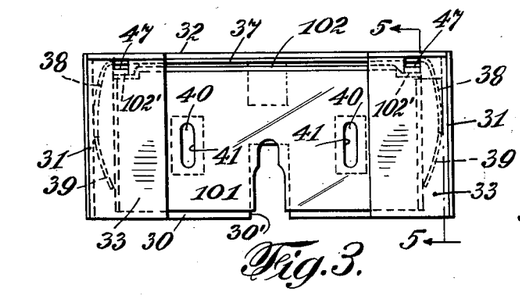
Figure 3 is a top plan view of one form of a device of my invention containing a plurality of one-edge safety razor blades.
Figure 4:
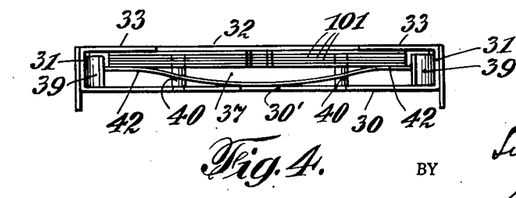
Figure 4 is a front view of the device of Figure 3.
Figure 5:
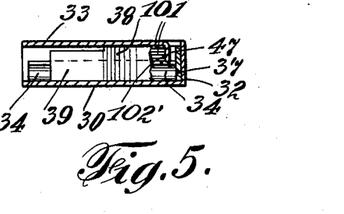
Figure 5 is a section taken on the line 5—5 of Figure 3.
Figure 6:
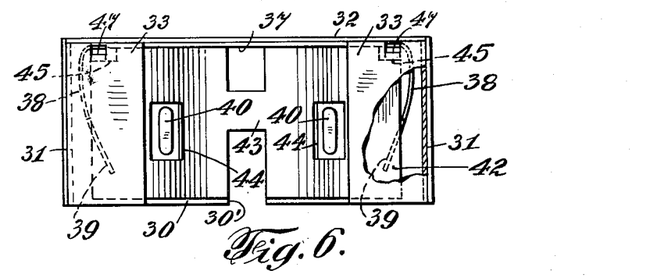
Figure 6 is a top plan view of the device of Figure 3 with the blades removed.
Figure 7:
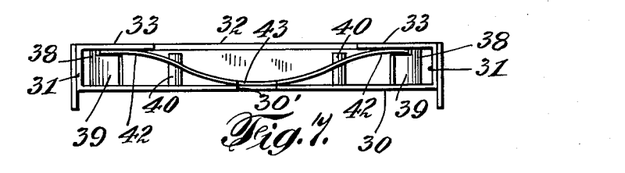
Figure 7 is a front view of the device of Figure 6.

This form of my device is shown as adapted for use with one-edge safety razor blades 101, 101 having a cutting edge 102.

The bottom carries two upwardly extended studs 40, 40 adapted for insertion into corresponding openings 41, 41 of the blade 101, the length of these studs being just sufficiently less than the distance between the inner faces of the bottom 30 and the lower faces of the top members 33, 33 to allow of the withdrawal of only the upper razor blade 101. The blade spring comprises the two end members 42, 42 connected at 43, having the openings 44, 44 and the recessed corners 45, 45 and is fixed to the bottom 30 by rivet 46. The barrier spring is similar to that previously described with respect of Figures 1 and 2, except that the members 38, 38 and 39, 39 are in the same arc. Each top member 33 carries a downwardly extended cut-out finger 47, adapted to fit into the recessed corners 102', 102' of the blade 101, preventing the edge 102 of the blade 101 from contacting the rear portion 37 of the barrier-spring.

The operation of this form of my device is similar as that previously described with regard to the device of Figures 1 and 2, except that the stack of blades is retained in position by the studs 40, 40 instead of by the barrier ends 39, 39 of the previously described device.

Figure 10:
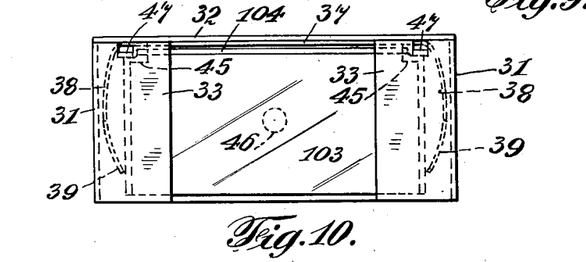
Figure 10 is a top plan view of a modified form of a device of my invention containing a plurality of one-edge safety razor blades.
Figure 11:
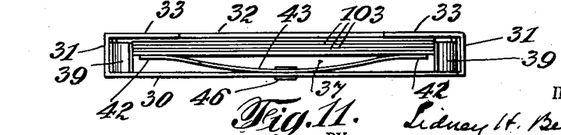
Figure 11 is a front view of the device of Figure 10.
Figure 12:
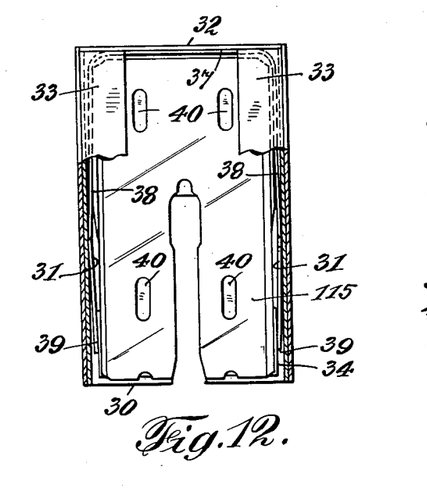
Figure 12 is a top plan view of a modified form of a device of my invention containing a plurality of two-edge safety razor blades.
Figure 13:
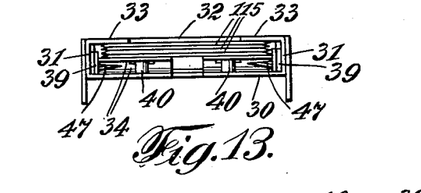
Figure 13 is a front view of the device of Figure 12.
Figure 14:
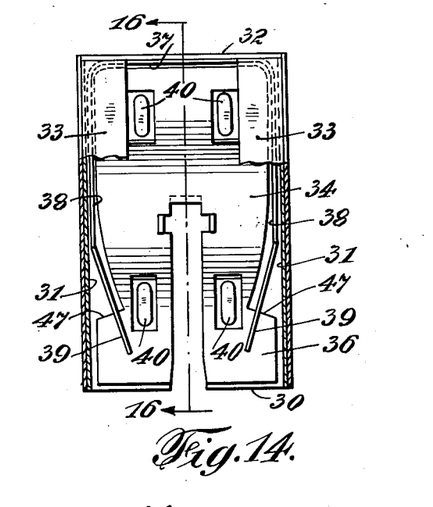
Figure 14 is a top plan view of the device of Figure 12 with the blades removed.
Figure 15:
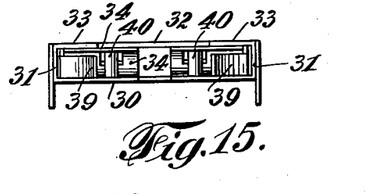
Figure 15 is a front view of the device of Figure 14.
Figure 16:
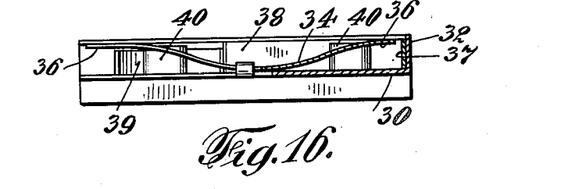
Figure 16 is a section through the line 16—16 of Figure 14.
Figure 18:
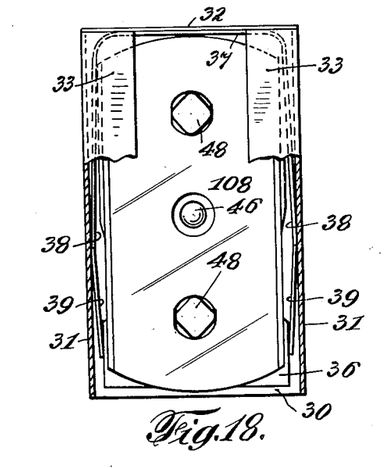
Figure 18 is a top plan view of a modified form of a device of my invention containing a plurality of two-edge safety razor blades.
Figure 19:
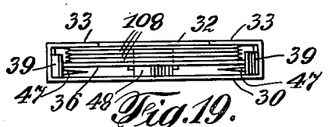
Figure 19 is a front view of the device of Figure 18.
Figure 20:
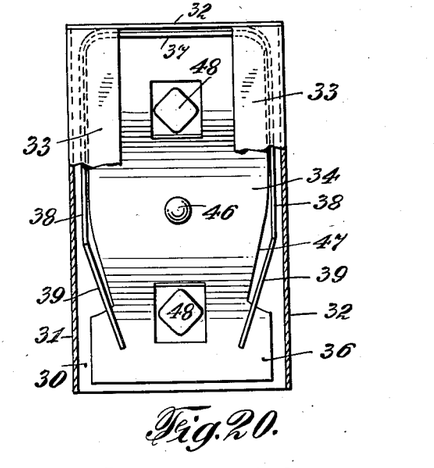
Figure 20 is a top plan view of the device of Figure 18 with the blades removed.
Figure 21:
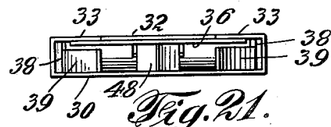
Figure 21 is a front view of the device of Figure 20.
Figure 22:
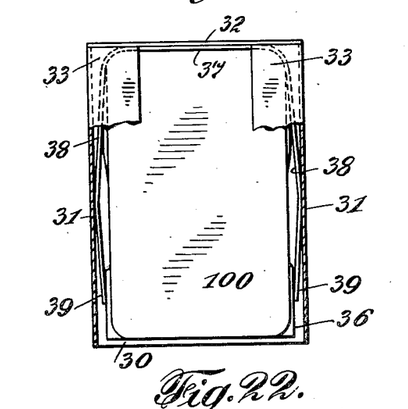
Figure 22 is a top plan view of a modified form of a device of my invention containing a plurality of two-edge safety razor blades.
Figure 23:
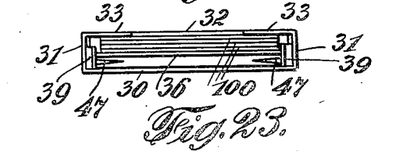
Figure 23 is a front view of the device of Figure 22.
Figure 24:
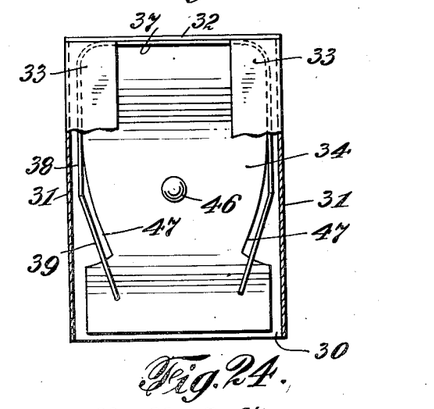
Figure 24 is a top plan view of the device of Figure 22 with the blades removed.
Figure 25:
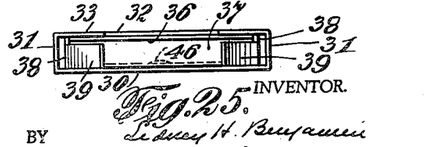
Figure 25 is a front view of the device of Figure 24.
Figure 26:
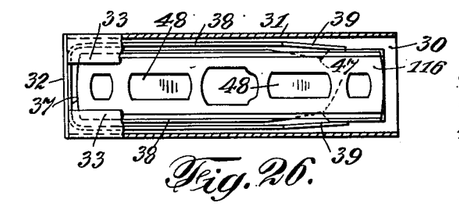
Figure 26 is a top plan view of a modified form of a device of my invention with blades inserted.
Figures 27, 28, 30, 31, 32, 33, 34, 35:
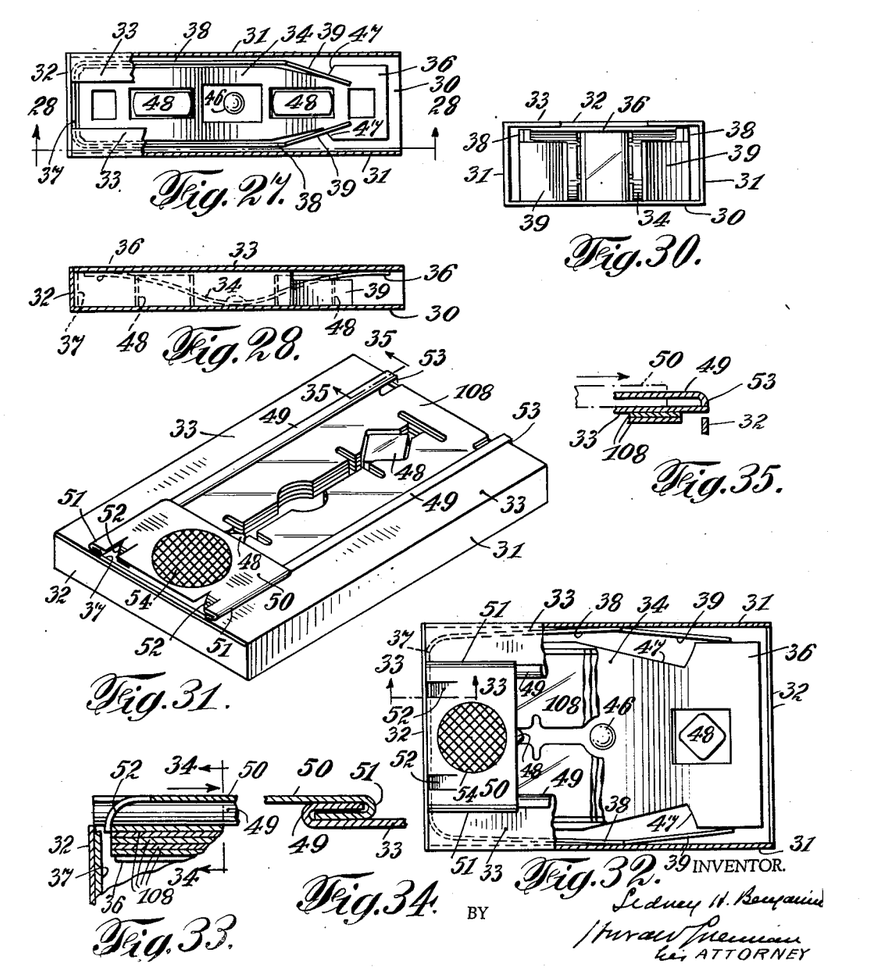
Figure 27 is a top plan view of the device of Figure 26 with the blades removed.
Figure 28 is a section through the line 28—28 of Figure 27.
Figure 30 is an end view of the device of Figure 28.
Figure 31 is a perspective view of a modified form of a device of my invention with blades introduced.
Figure 32 is a top plan view of the device of Figure 31 partly broken away for purposes of description.
Figure 33 is a fragmentary section through the line 33—33 of Figure 32.
Figure 34 is a section through the line 34—34 of Figure 33.
Figure 35 is a section through the line 35—35 of Figure 31.
Figure 29:
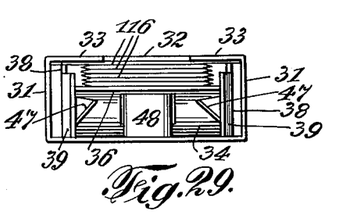
Figure 29 is an end view of the device of Figure 26.

The modified form of a device of my invention shown in Figures 10 and 11, adapted for use with a one-edge blade 103 having a cutting edge 104 is similar to those previously shown and especially that of Figures 3 to 9 except that the blade 103 has no openings in it, the bottom 30 has no recess, and the spring is affixed to the bottom 30 by means of a rivet 46.

It is to be noted that in this form of my device, the blade spring is less in length than the blades 103, 103, and hence, the blades 103, 103 maintain the ends 39, 39 of the barrier spring in their outward position until the last blade has been removed.

The operation of this form of my device is similar to that previously described.

The modified form of my device shown in Figures 12 to 17, inclusive, is adapted for containing a plurality of stacked double-edge razor blades 115, 115 and is similar to that shown in Figures 3 to 9 except that the spring 34 has a cut-out 47 to allow the barrier ends 39, 39 to pass under the ends 36, 36 of the spring 34 when the last blade has been removed.

The modified form of a device of my invention shown in Figures 18 to 21, inclusive, is adapted for use with those double-edge razor blades 108, 108 having an elongated opening or a plurality of openings positioned longitudinally of the blade and is similar to those previously described, the bottom 30 having a plurality of upwardly extended studs 48, 48, the upper portions of which are spaced from the top members 33, 33 a distance equal to the thickness of the blade to be removed and so positioned as to pass through openings in the blades and adapted to prevent the blade edges from touching the sides of the container.

The operation of this form of my device is similar to those previously described.

The modified form of a device of my invention shown in Figures 22 to 25, inclusive, is adapted for containing cards and is similar to those previously described, especially that shown in Figures 1 and 2, with the exception that the cards are withdrawn lengthwise instead of crosswise.

The modified form of a device of my invention shown in Figures 26 to 30, inclusive, is adapted for use with narrow two-edged blades 116, 116 and is constructively similar to the device shown in Figures 18 to 21 except that it is narrower and the blade has more openings, this difference being due to the difference in the construction of the razors with which the respective blades are used.

The modified form of a device of my invention shown in Figures 31 to 35, inclusive, which is adapted for use with double-edge blades is similar to those previously described, with the exception that it carries means for the ejection of the top blade.

In this form of my device the inner edges of the top members 33, 33 are turned upwardly forming U-shaped members 49, 49. The ejector member has the top plate 50, the outer edges of which are bent to form the U-shaped members 49, 49 which co-act with the U-shaped members 49, 49 to allow the ejector to slide over the device. The ejector plate 50 has two downwardly extended tongues 52, 52, which extend downwardly to abut upon the top blade only; the movement of the ejector, therefore, will move and eject only the top blade, allowing the remaining blades to remain within the magazine. Two stop members 53, 53 prevent the ejector from being completely removed from the magazine. A depression 54 is made in the ejector plate 50 for the insertion of a finger to facilitate the movement of the ejector.

Figure 36:
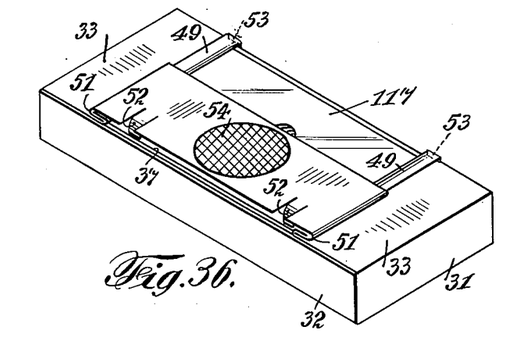
Figure 36 is a perspective view of a modified form of a device of my invention with blades introduced.
Figure 37:
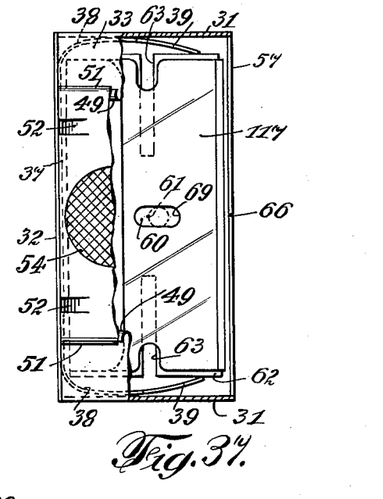
Figure 37 is a top plan view of the device of Figure 36, partly broken away for purposes of description.

The modified form of my device shown in Figures 36 and 37 is similar to that shown in Figures 31 to 35, inclusive, with the exception that the various parts are arranged to cooperate with single-edge blades 117, 117.

Figure 38:
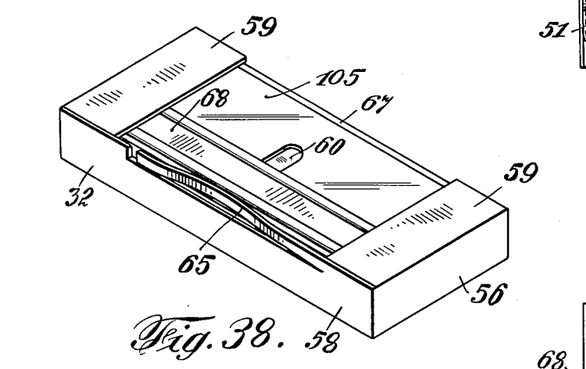
Figure 38 is a perspective view of a modified form of a device of my invention with blades introduced.
Figure 39:
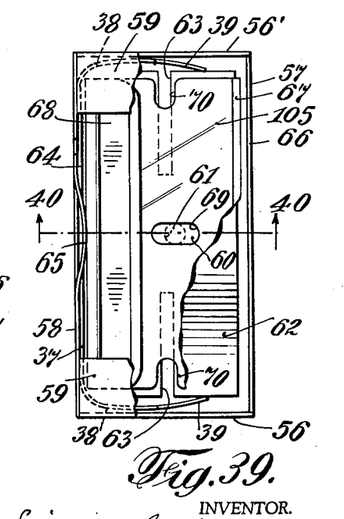
Figure 39 is a top plan view of the device of Figure 38, partly broken away for purposes of description.
Figure 40:
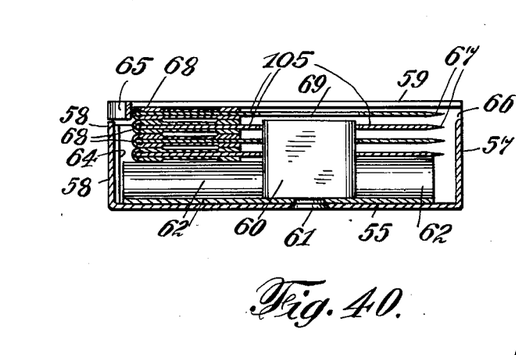
Figure 40 is an enlarged section through the line 40—40 of Figure 39.

The modified form of my device shown in Figures 38 to 40, inclusive, is adapted for use with single-edge blades having reinforced backs.

This form of my device comprises the bottom 55, the two ends 56, 56', the front 57, the back 58 and the two top members 59, 59.

A post, or stud, 60 is fixedly attached to the bottom 55 by means of the rivet member 61 and is separated from the top members a distance equal to the thickness of the blade to be removed. Fixedly attached to the bottom 55 is a leaf blade spring 62, having longitudinal recesses 63, 63, this spring being longitudinally longer than the blades 105, 105. A barrier spring 64 similar to that shown in Figure 17 is positioned within the magazine.

The rear member 58 has a cut-out 65, the central portion of which is bent inwardly for purposes described later.

The front member 57 is spaced from the lower faces of the top members 59, 59 forming an opening 66 at least equal to the thickness of the back portion of the blades 68, 68. Each of the blades 105, employed with this form of my device, has a cutting edge 67, the back of the blade being reinforced by the metal reinforcing member 68, each blade having an opening 69 and two longitudinal recesses 70, 70.

It will be noted that as the blade spring 62 is divided longitudinally by the recesses 63, 63, one portion of the spring will contact the reinforced back of the bottom blade, while the other portion of the spring will contact the forward portion of the blade as shown in Figure 40.

The width of the cut-out portion 65 of the back member 58 is such that when it is pushed inwardly it will contact only the uppermost blade, thus ejecting it to some extent through the opening 66, allowing its complete withdrawal. When the uppermost blade is withdrawn the blade spring 62 will force the stack of blades upwardly presenting another blade for ejection.

The modified form of a device of my invention shown in Figures 41 to 47 comprises a casing having the bottom 75, the two sides 76, 76, the two top members 77, 77, the front end 78 separated from the under faces of the top members 77, 77 a distance equal to at least the thickness of a blade carried by the device forming the opening 79 and a back end 80 separated from the under faces of the top members 77, 77 a distance equal to at least the thickness of a blade carried by the device forming the opening 81. This back end 80 may be omitted under certain circumstances. A leaf blade spring 82 is fixedly attached to the bottom 75 by means of the threaded member 83. A split cylindrical barrier spring 84 having the narrowed portion 85 is fixedly attached to the bottom 75, by the cut-out member 86 bent over the narrow portion 85 of the barrier spring 84.

A plurality of one-edge blades 106, 106 are stacked within the magazine over the blade spring 82, which forces the stack of blades upwardly, the topmost blade abutting upon the under faces of the top members 77, 77. As the blade spring 82 is wider than the blades, the spring 82 will spread the sections of the barrier spring 84 apart as shown in Figure 42.

It will be noted that if a pressure or ejecting force be exerted upon the top blade, that blade will be drawn, or ejected, from the magazine, and the blade spring 82 will force the next uppermost blade against the top members 77, 77, thus placing the blades successively for removal from the magazine.

Figures 41, 42, 44:
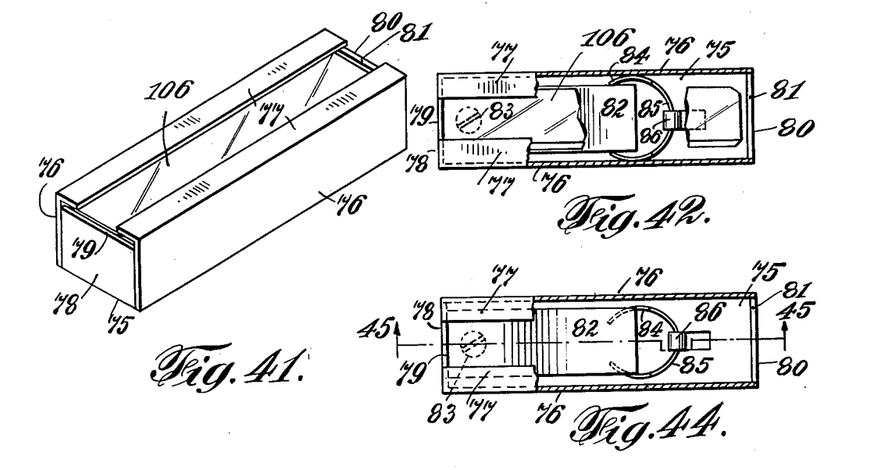
Figure 41 is a perspective view of a modified form of a device of my invention with blades introduced.
Figure 42 is a top plan view of the device of Figure 41, partly broken away for purposes of description.
Figure 44 is a top plan view of the device of Figure 41 with blades removed and partly broken away for purposes of description.
Figure 43:
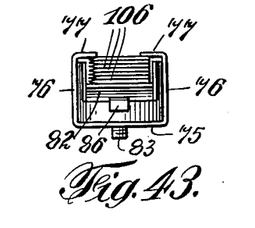
Figure 43 is an end view of the device of Figure 42.
Figure 45:
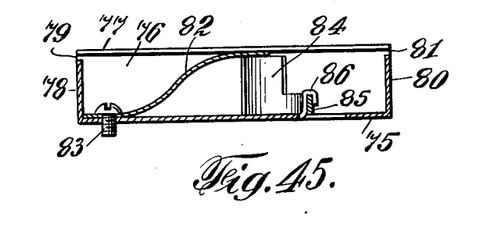
Figure 45 is a section on the line 45—45 of Figure 44.
Figure 46:
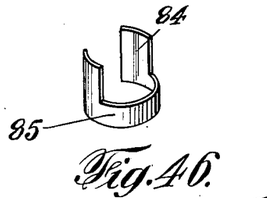
Figure 46 is a perspective view of the barrier-spring of the device of Figures 41 to 45.
Figure 47:
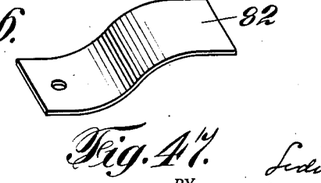
Figure 47 is a perspective view of the blade leaf spring of my device of Figures 41 to 45.
Figure 48:
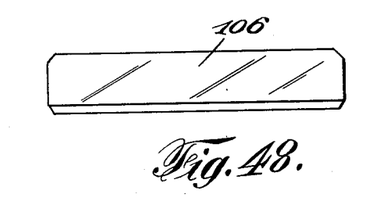
Figure 48 is a plane view of a razor blade shown in the preceding figures.

When, however, the last blade is removed, the free end portion of the blade spring will move upwardly from contact with the barrier spring 82, whereupon, the two separated free end sections of the barrier spring will move inwardly toward each other and the blade spring will be above the barrier spring as shown in the Figures 44 and 45, thus, preventing the introduction of a blade into the magazine.

It will thus be seen that my invention presents magazine devices adapted to receive and retain a plurality of stacked safety razor blades, single- edged or double-edged, wrapped or unwrapped, and other commodities of a similar physical formation, with means for allowing the withdrawal, or ejection, of the uppermost member of the stacked articles, while retaining the remainder of the articles within the magazine, and means for successively presenting the articles for withdrawal, or ejection, with means adapted to prevent the insertion of razor blades or other similar articles into the magazine.

I do not limit myself to the particular size, shape, number, arrangement or character of parts as specifically shown and described, as these are given solely for the purpose of clearly describing my invention.

What I claim is:

1. A magazine adapted to contain a plurality of stacked articles comprising a top element having an opening therein, a bottom element, two side elements, one of which has an opening adapted to allow of the passage of a single said article therethrough, and two end elements; a resilient positioning element adapted to position the uppermost of said articles into position for removal through said opening and capable of abutment upon the inner face of said top element upon the removal of all of said articles; and at least one resilient barrier element adapted to retain said resilient positioning element in abutment upon the inner face of said top element when all of said articles are removed.

2. A magazine adapted to contain a plurality of stacked articles comprising a top element, having an opening therein, a bottom element, two side elements, one of which has an opening adapted to allow of the passage of a single said article therethrough, and two end elements; a resilient positioning element adapted to position the uppermost of said articles into position for removal through said opening and capable of abutment upon the inner face of said top element upon the removal of all of said articles; and at least one resilient barrier element positioned below and adapted to retain said resilient positioning element in abutment upon the inner face of said top element when all of said articles are removed.

3. A magazine adapted to contain a plurality of stacked articles comprising a top element, having an opening therein, a bottom element having a recess therein, two side elements, one of which has an opening adapted to allow of the passage of a single said article therethrough, and two end elements; a resilient positioning element adapted to position the uppermost of said articles into position for removal through said opening and capable of abutment upon the inner face of said top element upon the removal of all of said articles; and at least one resilient barrier element adapted to retain said resilient positioning element in abutment upon the inner face of said top element when all of said articles are removed.

4. A magazine adapted to contain a plurality of stacked articles comprising a top element, having an opening therein, a bottom element, having a recess therein, two side elements, one of which has an opening adapted to allow of the passage of a single said article therethrough, and two end elements; a resilient positioning element adapted to position the uppermost of said articles into position for removal through said opening and capable of abutment upon the inner face of said top element upon the removal of all of said articles; and at least one resilient barrier element positioned below and adapted to retain said resilient positioning element in abutment upon the inner face of said top element when all of said articles are removed.

5. A magazine adapted to contain a plurality of stacked razor blades comprising a top element having an opening therein, a bottom element, two side elements, one of which has an opening adapted to allow of the passage of a single said razor blade therethrough, and two end elements; a resilient positioning element adapted to position the uppermost of said razor blades into position for removal through said opening and capable of abutment upon the inner face of said top element upon the removal of all of said razor blades; and at least one resilient barrier element adapted to retain said resilient positioning element in abutment upon the inner face of said top element when all of said razor blades are removed.

6. A magazine adapted to contain a plurality of stacked razor blades comprising a top element, having an opening therein, a bottom element, two side elements, one of which has an opening adapted to allow of the passage of a single said razor blade therethrough, and two end elements; a resilient positioning element adapted to position the uppermost of said razor blades into position for removal through said opening and capable of abutment upon the inner face of said top element upon the removal of all of said razor blades; and at least one resilient barrier element positioned below and adapted to retain said resilient positioning element in abutment upon the inner face of said top element when all of said razor blades are removed.

7. A magazine adapted to contain a plurality of stacked razor blades comprising a top element, having an opening therein, a bottom element having a recess therein, two side elements, one of which has an opening adapted to allow of the passage of a single said razor blade therethrough, and two end elements; a resilient positioning element adapted to position the uppermost of said razor blades into position for removal through said opening and capable of abutment upon the inner face of said top element upon the removal of all of said razor blades; and at least one resilient barrier element adapted to retain said resilient positioning element in abutment upon the inner face of said top element when all of said razor blades are removed.

8. A magazine adapted to contain a plurality of stacked razor blades comprising a top element, having an opening therein, a bottom element, having a recess therein, two side elements, one of which has an opening adapted to allow of the passage of a single said razor blade therethrough, and two end elements, a resilient positioning element adapted to position the uppermost of said razor blades into position for removal through said opening and capable of abutment upon the inner face of said top element upon the removal of all of said razor blades; and at least one resilient barrier element positioned below and adapted to retain said resilient positioning element in abutment upon the inner face of said top element when all of said razor blades are removed.

SIDNEY H. BENJAMIN.